(12) United States Patent
Jeong et al.

(10) Patent No.: US 8,434,537 B2
(45) Date of Patent: May 7, 2013

(54) MANUFACTURING DEVICE OF STEROSCOPIC IMAGE DISPLAY PANEL

(75) Inventors: Jaewuk Jeong, Daegu (KR); Keunhyuk Yang, Gumi-si (KR); Bosun Kim, Gumi-si (KR); Younggyun Han, Jeonju-si (KR)

(73) Assignees: LG Display Co., Ltd., Seoul (KR); YTS Co., Ltd., Ansan-Si, Gyeonggi-Do (KR)

( * ) Notice: Subject to any disclaimer, the term of this patent is extended or adjusted under 35 U.S.C. 154(b) by 0 days.

(21) Appl. No.: 13/271,001

(22) Filed: Oct. 11, 2011

(65) Prior Publication Data

US 2012/0090786 A1   Apr. 19, 2012

(30) Foreign Application Priority Data

Oct. 12, 2010   (KR) .................. 10-2010-0099043

(51) Int. Cl.
*B32B 41/00* (2006.01)

(52) U.S. Cl.
USPC ............. 156/379; 156/64; 156/350; 156/351; 156/358; 156/362; 156/363; 156/367; 156/378; 156/580; 156/582

(58) Field of Classification Search .............. 156/64, 156/350, 351, 358, 362, 363, 367, 378, 379, 156/580, 582
See application file for complete search history.

(56) References Cited

U.S. PATENT DOCUMENTS

| | | | |
|---|---|---|---|
| 2008/0169063 A1* | 7/2008 | Fang et al. | 156/299 |
| 2009/0097117 A1* | 4/2009 | Coleman | 359/497 |
| 2012/0162399 A1* | 6/2012 | Park et al. | 348/54 |

FOREIGN PATENT DOCUMENTS

| | | |
|---|---|---|
| KR | 10-2006-0001561 A | 1/2006 |
| KR | 10-0643390 B1 | 10/2006 |

* cited by examiner

*Primary Examiner* — Katarzyna Wyrozebski Lee
*Assistant Examiner* — Joshel Rivera
(74) *Attorney, Agent, or Firm* — Birch, Stewart, Kolasch & Birch, LLP

(57) ABSTRACT

A manufacturing device of a stereoscopic image display panel includes a first unit for transferring a display panel provided in a display panel preparation space to an attachment space, a second unit for transferring a control film provided in a control film preparation space to the attachment space, and a drum unit positioned in the attachment space. The drum unit adsorbs the control film transferred to the attachment space by the second unit in a non-vacuum manner and rotates so as to attach the control film to a display surface of the display panel.

11 Claims, 7 Drawing Sheets

Fig. 1

<Before the attachment>

<After the attachment>

MANUFACTURING DEVICE OF STEROSCOPIC IMAGE DISPLAY PANEL

This application claims the benefit of Korean Patent Application No. 10-2010-0099043 filed on Oct. 12, 2010, the entire contents of which is incorporated herein by reference for all purposes as if fully set forth herein.

BACKGROUND OF THE INVENTION

1. Field of the Invention

Embodiments of the invention relate to a manufacturing device of a stereoscopic image display panel.

2. Description of the Related Art

A stereoscopic image display implements a three-dimensional (3D) image using a stereoscopic technique and an autostereoscopic technique.

The stereoscopic technique, which uses a parallax image between left and right eyes of a user with a high stereoscopic effect, includes a glasses type method and a non-glasses type method, both of which have been put to practical use. In the glasses type method, the parallax image between the left and right eyes is displayed on a direct-view display or a projector through a change in a polarization direction of the parallax image or in a time-division manner, and a stereoscopic image is implemented using polarization glasses or liquid crystal shutter glasses. In the non-glasses type method, an optical plate such as a parallax barrier for separating an optical axis of the parallax image between the left and right eyes is generally installed in front of or behind a liquid crystal display panel. Recently, a glasses type stereoscopic image display using a film patterned retarder (i.e., an optical film), which changes light modulation characteristic in each pattern, has been actively studied by various technological developments of the stereoscopic image display.

Figure 1:
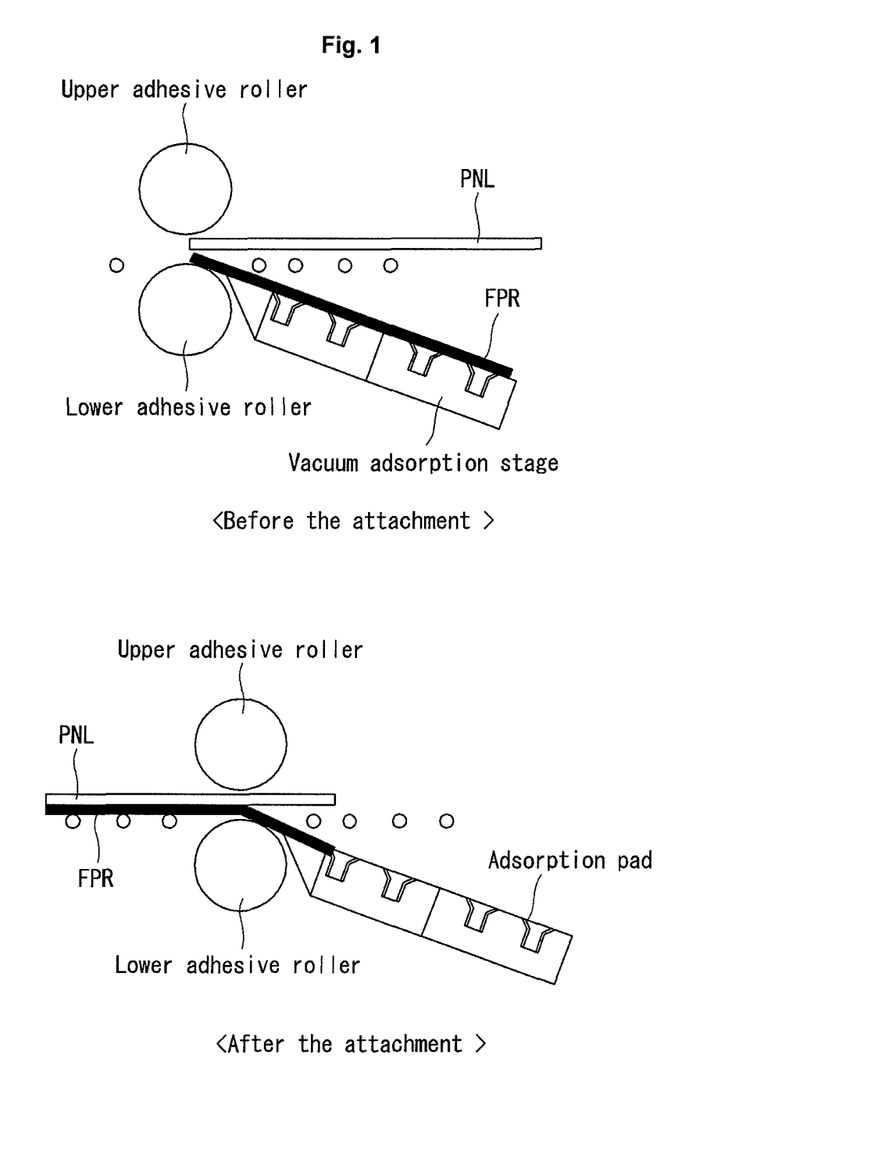
FIG. 1 illustrates a manufacturing device of a related art stereoscopic image display.

FIG. 1 illustrates a manufacturing device of a related art stereoscopic image display. As shown in FIG. 1, a film patterned retarder FPR of the related art stereoscopic image display is attached to a display panel PNL using an attachment device including a vacuum adsorption stage and an adhesive roller. Because the related art attachment device transfers the film patterned retarder FPR, which is slantly loaded on the vacuum adsorption stage, to a location area of the adhesive roller, a deviation in an adhesive strength between the film patterned retarder FPR and the display panel PNL and a non-adsorption area between the film patterned retarder FPR are generated during an attachment process. Hence, bubbles are generated between the film patterned retarder FPR and the display panel PNL after the attachment process, and the reliability and the display quality of the stereoscopic image display manufactured using the related art attachment device are reduced.

SUMMARY OF THE INVENTION

In one aspect, there is a manufacturing device of a stereoscopic image display panel including a first unit configured to transfer a display panel provided in a display panel preparation space to an attachment space, a second unit configured to transfer a control film provided in a control film preparation space to the attachment space, and a drum unit positioned in the attachment space, the drum unit being configured to adsorb the control film transferred to the attachment space by the second unit in a non-vacuum manner and rotate so as to attach the control film to a display surface of the display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 2:
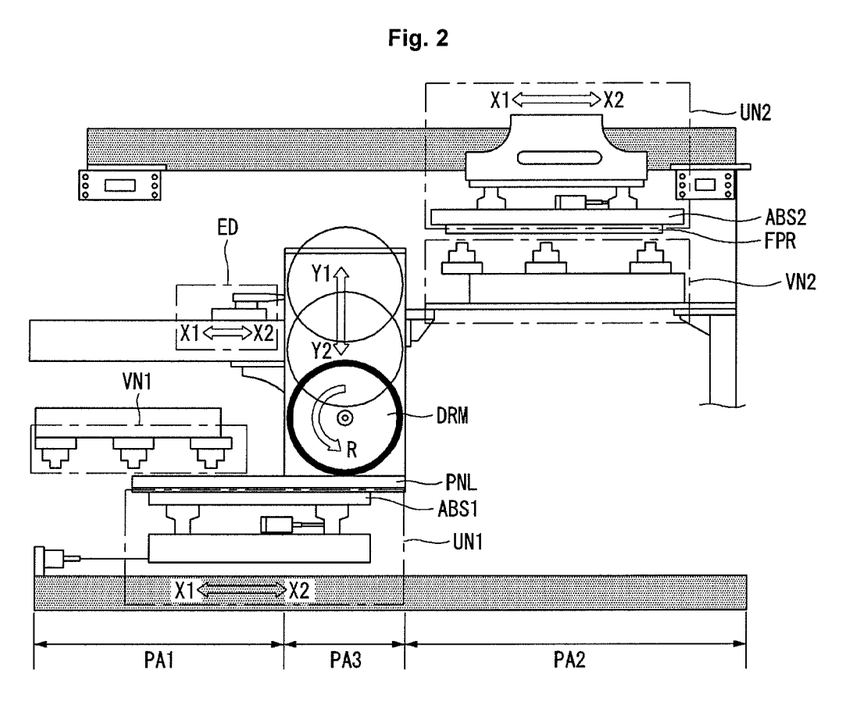
FIG. 2 schematically illustrates a manufacturing device of a stereoscopic image display panel according to an example embodiment of the invention.

FIG. 2 schematically illustrates a manufacturing device of a stereoscopic image display panel according to an example embodiment of the invention.

As shown in FIG. 2, the manufacturing device of the stereoscopic image display panel according to the example embodiment of the invention is an attachment device for attaching a display panel PNL to a control film FPR. The manufacturing device of the stereoscopic image display panel includes a first unit UN1, a first vision unit VN1, a second unit UN1, a second vision unit VN2, a peeling unit ED, and a drum unit DRM.

The first unit UN1 transfers the display panel PNL provided in a display panel preparation space PA1 to an attachment space PA3. The first unit UN1 adsorbs and aligns the display panel PNL loaded in the display panel preparation space PA1 using a first vacuum adsorption unit ABS1. The first vacuum adsorption unit ABS1 moves in at least one direction of X-axis, Y-axis, and Z-axis directions, so as to adsorb and align the loaded display panel PNL.

The first unit UN1 is interlocked with the first vision unit VN1 and aligns the display panel PNL loaded on a table of the first vacuum adsorption unit ABS1. When the display panel PNL is aligned on the table of the first vacuum adsorption unit ABS1, the first unit UN1 moves from a first direction X1 to a second direction X2 and thus transfers the display panel PNL to the attachment space PA3.

The second unit UN2 transfers the control film FPR provided in a control film preparation space PA2 to the attachment space PA3. The second unit UN2 adsorbs and aligns the control film FPR loaded in the control film preparation space PA2 using a second vacuum adsorption unit ABS2. The second vacuum adsorption unit ABS2 moves in at least one direction of the X-axis, Y-axis, and Z-axis directions, so as to adsorb and align the loaded control film FPR.

The second unit UN2 is interlocked with the second vision unit VN2 and aligns the control film FPR loaded on a table of the second vacuum adsorption unit ABS2. When the control film FPR is aligned on the table of the second vacuum adsorption unit ABS2, the second unit UN2 moves from the second direction X2 to the first direction X1 and thus transfers the control film FPR to the attachment space PA3.

The drum unit DRM is positioned in the attachment space PA3 and adsorbs the control film FPR, that is transferred to the attachment space PA3 by the second unit UN2, in a non-vacuum manner. The drum unit DRM rotates so as to attach the control film FPR to a display surface of the display panel PNL. When the control film FPR is adsorbed by the drum unit DRM in the non-vacuum manner, the drum unit DRM moves from a third direction Y1 to a fourth direction Y2 and rotates in one direction R (a counterclockwise direction R in FIGS. 2 and 3) so as to attach the control film FPR to the display surface of the display panel PNL. In the embodiment of the invention, the display panel preparation space PA1 and the control film preparation space PA2 are disposed at different heights and at different locations. Thus, the drum unit DRM reciprocates up and down in the attachment space PA3 and rotates in the one direction R, thereby attaching the control film FPR to the display surface of the display panel PNL. The drum unit DRM may rotate in at least one of a clockwise direction and the counterclockwise direction based on the locations of the display panel preparation space PA1 and the control film preparation space PA2.

When the drum unit DRM adsorbs the control film FPR, the peeling unit ED moves in a direction of the attachment space PA3 and peels a release film attached to the surface of the control film FPR. The peeling unit ED moves from the first direction X1 to the second direction X2 and is positioned in an area adjacent to the attachment space PA3, thereby peeling and recovering the release film attached to the surface of the control film FPR.

The movement or the rotation of the first vacuum adsorption unit ABS1, the second vacuum adsorption unit ABS2, the drum unit DRM, and the peeling unit ED is configured by a mechanical device including a motor, etc., but is not limited thereto.

Figure 3:
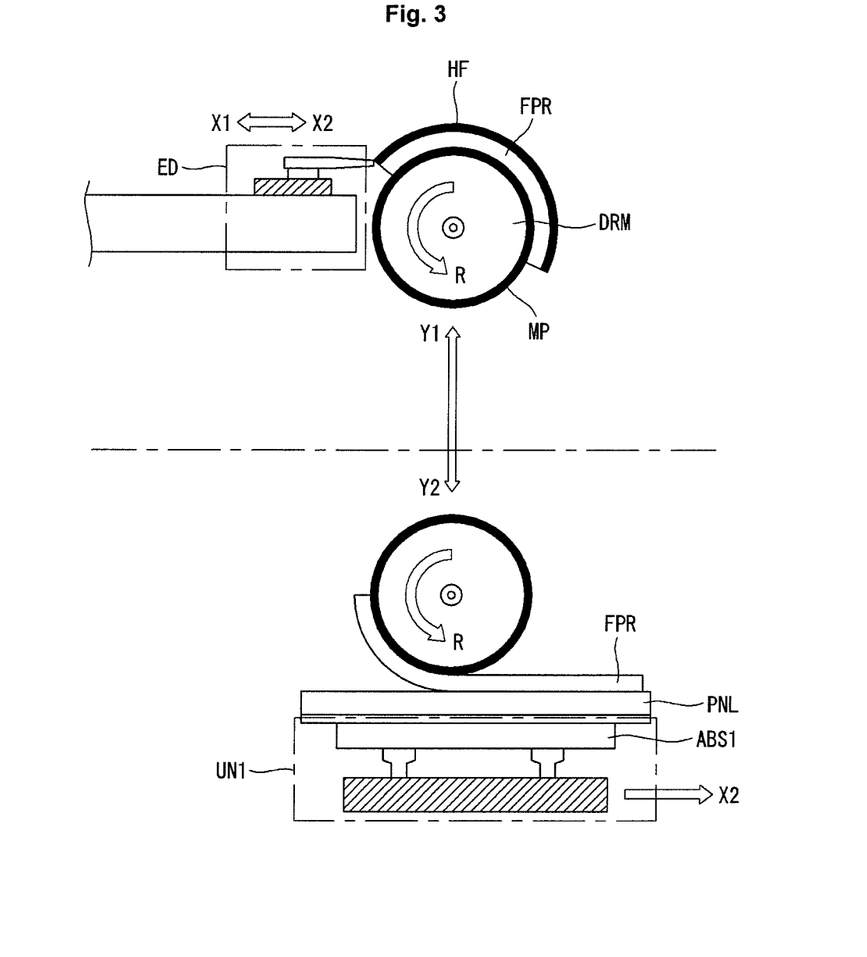
FIG. 3 illustrates a process performed in an attachment space.

A process performed in the attachment space PA3 is described in detail below.

FIG. 3 illustrates a process performed in the attachment space.

As shown in FIGS. 2 and 3, the drum unit DRM adsorbs the control film FPR using a micropad MP, that is attached to an outer circumference of the drum unit DRM, in the non-vacuum manner. The micropad MP is formed of polyacrylic resin, etc. so as to adsorb the control film FPR in the non-vacuum manner. Further, a thin sheet having fine holes is selected as the micropad W. Hence, when the drum unit DRM rotates in the one direction R, the control film FPR transferred from the control film preparation space PA2 is adsorbed on the outer circumference of the drum unit DRM. As described above, when the control film FPR is adsorbed on the drum unit DRM, the peeling unit ED moves to the area adjacent to the attachment space PA3 and peels and recovers a release film HF attached to the surface of the control film FPR.

The micropad MP of the drum unit DRM may be formed by forming fine holes in a material such as polyurethane and silicon rubber. The micropad MP formed of polyurethane and silicon rubber may provide substantially the same adsorption strength as the micropad MP formed of polyacrylic resin or an adsorption strength similar to the micropad MP formed of polyacrylic resin.

As above, because the drum unit DRM applies the non-vacuum manner using the micropad MP to the adsorption of the control film FPR, components for forming vacuum are not necessary in the drum unit DRM. Hence, the light-weight drum unit DRM may be simply manufactured. Further, because the components for forming vacuum are not necessary, the drum unit DRM may adsorb the control film FPR having various sizes irrespective of the size of the control film FPR.

Next, when the drum unit DRM adsorbs the control film FPR in the non-vacuum manner, the drum unit DRM moves from the third direction Y1 to the fourth direction Y2 and rotates in the one direction R so as to attach the control film FPR to the display surface of the display panel PNL. The first unit UN1 transfers the display panel PNL aligned on the table of the first vacuum adsorption unit ABS1 to the attachment space PA3 and moves in the second direction X2 similar to a rotation direction of the drum unit DRM.

When the control film FPR is attached to the display surface of the display panel PNL using the above-described method, an attachment tolerance between the display panel PNL and the control film FPR is not generated. Hence, the defective attachment resulting from the generation of bubbles between the display panel PNL and the control film FPR is prevented.

An alignment system is described in detail below.

Figure 4:
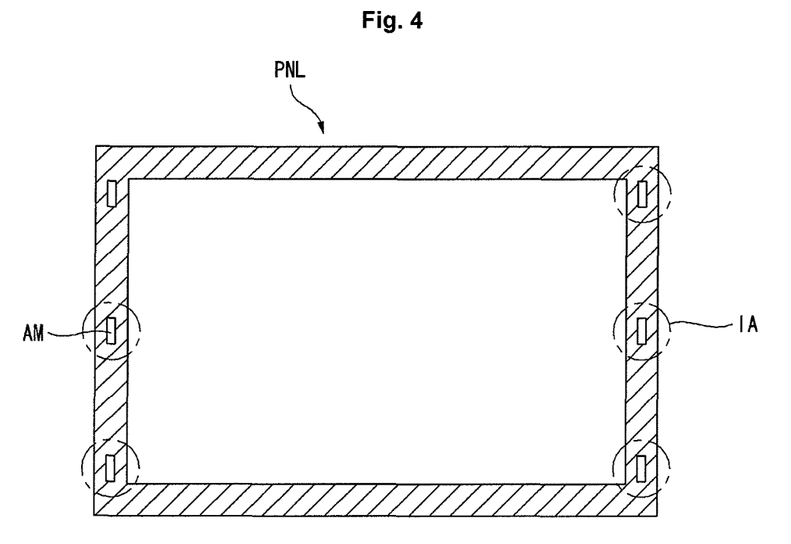
FIG. 4 illustrates alignment marks formed on a display panel and a vision recognition area.
Figure 5:
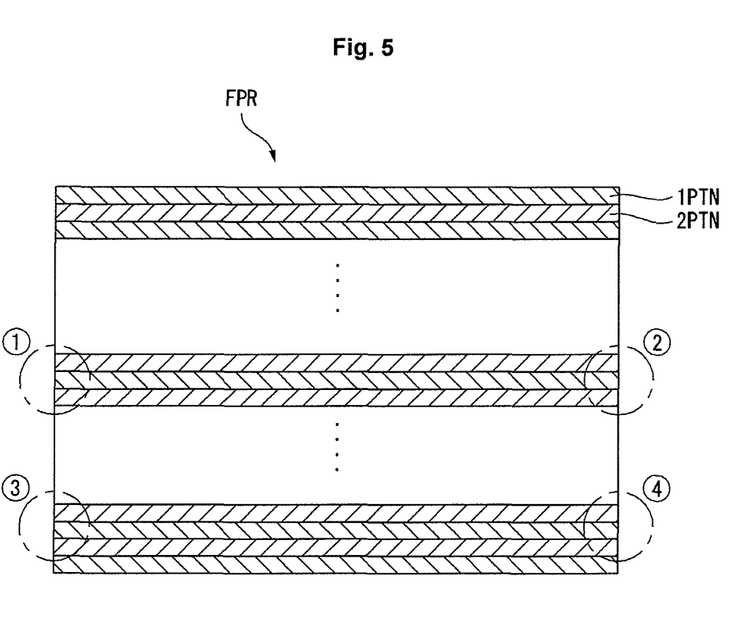
FIG. 5 illustrates a structure of a control film and a vision recognition area.
Figure 6:
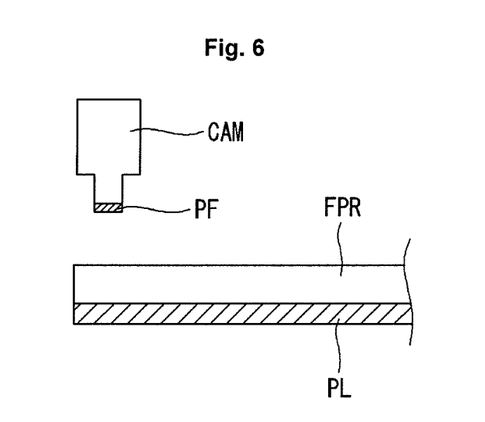
FIGS. 6 and 7 illustrate a vision system for recognizing a control film.
Figure 7:
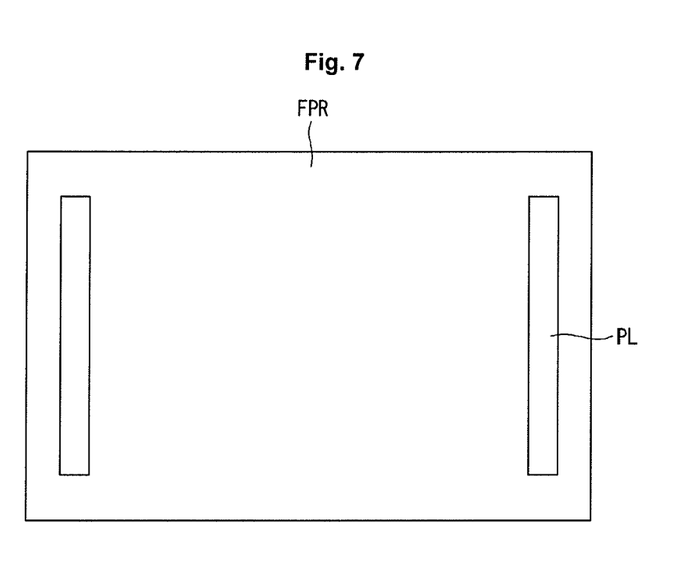

FIG. 4 illustrates alignment marks formed on a display panel and a vision recognition area. FIG. 5 illustrates a structure of a control film and a vision recognition area. FIGS. 6 and 7 illustrate a vision system for recognizing a control film.

As shown in FIGS. 2 to 4, alignment marks AM recognized by the first vision unit VN1 are formed in an outer area of the display panel PNL. The first vision unit VN1 includes at least one camera for recognizing the alignment marks AM of the display panel PNL. The first vision unit VN1 is positioned in the display panel preparation space PA1 and recognizes a formation area of the alignment marks AM using the camera fixed at a location corresponding to the alignment marks AM of the display panel PNL. The first vision unit VN1 having the above-described configuration recognizes the formation area of the alignment marks AM as a recognition area IA and operates so that the loaded display panel PNL is precisely aligned on the table of the first vacuum adsorption unit ABS1.

As shown in FIGS. 2 to 5, the control film FPR is configured so that first patterned retarders 1PTN each having a first directionality and second patterned retarders 2PTN each having a second directionality are alternately disposed. Therefore, boundary lines are formed between the first patterned retarders 1PTN and the second patterned retarders 2PTN. The control film FPR generally includes a film patterned retarder, and the film patterned retarder separates a left eye image and a right eye image from an image displayed on the display panel PNL. The second vision unit VN2 includes at least one camera for recognizing the boundary lines between the first patterned retarders 1PTN and the second patterned retarders 2PTN. The second vision unit VN2 is positioned in the control film preparation space PA2 and recognizes a boundary area therebetween using the camera fixed at a location corresponding to an area capable of distinguishing between the first patterned retarders 1PTN and the second patterned retarders 2PTN. The second vision unit VN2 according to the embodiment of the invention is configured as follows, so that the control film, in which the first patterned retarders 1PTN and the second patterned retarders 2PTN are alternately disposed, is more precisely aligned.

The second vision unit VN2 includes two central cameras and two lower cameras. The two central cameras are respectively positioned in an outer area $\hat{1}$ of one side of a central area of the control film FPR and an outer area $\hat{2}$ of the other side and recognize the boundary lines between the first patterned retarders 1PTN and the second patterned retarders 2PTN in the outer areas $\hat{1}$ and $\hat{2}$. The two lower cameras are respectively positioned in an outer area $\hat{3}$ of one side of a lower area of the control film FPR and an outer area $\hat{4}$ of the other side and recognize the boundary lines between the first patterned retarders 1PTN and the second patterned retarders 2PTN in the outer areas $\hat{3}$ and $\hat{4}$. The control film FPR is aligned by the second vision unit VN2 including the fixed four cameras in the following manner.

In the embodiment of the invention, a first alignment process is performed by recognizing patterns formed in the outer areas $\hat{1}$ and $\hat{2}$ of the central area of the control film FPR using the central cameras. Next, a second alignment process is performed by recognizing patterns formed in the outer areas $\hat{3}$ and $\hat{4}$ of the lower area of the control film FPR using the lower cameras. The boundary lines between the first patterned retarders 1PTN and the second patterned retarders 2PTN may vary by a pitch tolerance generated when the control film FPR is manufactured. However, because the above-described method according to the embodiment of the invention performs the first alignment process in the central area of the control film FPR, an alignment error resulting from the pitch tolerance may be reduced.

The embodiment of the invention described the control film FPR as an example of the film patterned retarder used in the stereoscopic image display, but is not limited thereto. Other types of films may be used.

As shown in FIGS. 2 to 6, the second vision unit VN2 may recognize the boundary lines between the first patterned retarders 1PTN and the second patterned retarders 2PTN using a polarization filter PF attached to a light receiving unit of a camera CAM and a polarization film PL attached to the control film FPR. Because the control film FPR has a polarization component, the second vision unit VN2 thus formed may easily distinguish and recognize the boundary lines between the first patterned retarders 1PTN and the second patterned retarders 2PTN. As shown in FIG. 7, the polarization film PL of the control film FPR may be formed not in the entire area of the control film FPR but in only an area recognized by the camera CAM.

A vacuum adsorption system is described in detail below.

Figure 8:
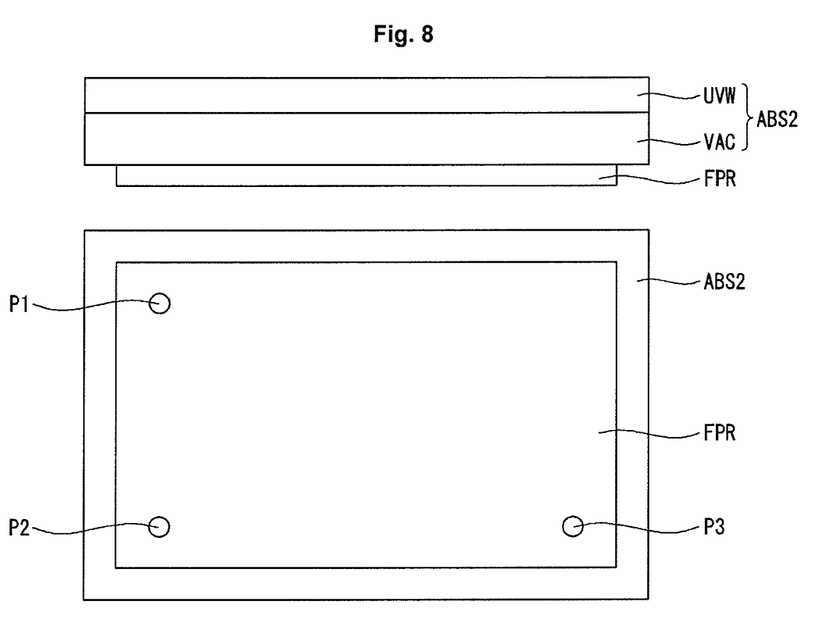
FIG. 8 illustrates a vacuum adsorption system.

FIG. 8 illustrates a vacuum adsorption system.

As shown in FIGS. 2 to 8, the second vacuum adsorption unit ABS2 of the second vision unit VN2 includes a vacuum unit VAC for adsorbing the control film FPR and an alignment unit UVW of the control film FPR adsorbed by the vacuum unit VAC. The control film FPR is aligned in a state where the control film FPR is absorbed by the alignment unit UVW including first to third points P1 to P3. The embodiment of the invention described the second vacuum adsorption unit ABS2 of the second unit UN2 as an example of the vacuum adsorption system. Further, the vacuum adsorption system is equally applied to the first vacuum adsorption unit ABS1 of the first unit UN1, but is not limited thereto.

Figure 9:
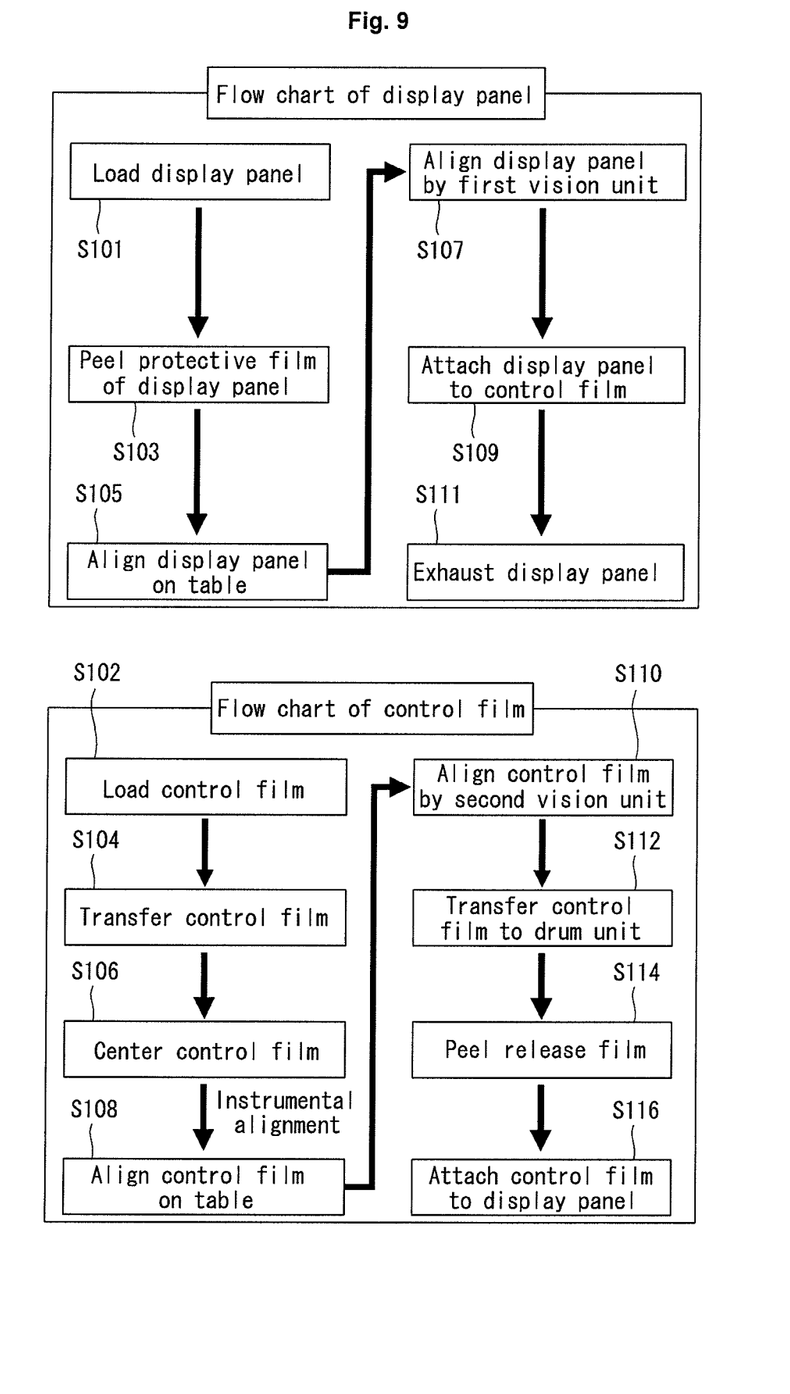
FIG. 9 is a flow chart illustrating a process for attaching a display panel to a control film.

FIG. 9 is a flow chart illustrating a process for attaching the display panel to the control film.

[Flow Chart of the Display Panel]

The display panel PNL is loaded in the display panel preparation space PA1 in step S101. The display panel PNL may be a liquid crystal display panel, an organic light emitting diode (OLED) display panel, or a plasma display panel.

A protective film of the loaded display panel PNL is peeled in step S103. When there is no protective film of the loaded display panel PNL, the process for peeling the protective film of the loaded display panel PNL may be omitted.

The loaded display panel PNL is aligned on the table of the first vacuum adsorption unit ABS1 in step S105.

The display panel PNL aligned on the table of the first vacuum adsorption unit ABS1 is again aligned by the first vision unit VN1 in step S107.

The display panel PNL aligned by the first vision unit VN1 is transferred to the attachment space PA3 by the movement of the first unit UN1, and the control film FPR is attached to the display surface of the display panel PNL by the rotation of the drum unit DRM in step S109.

The display panel PNL attached to the control film FPR is exhausted to an exhaust unit in step S111.

[Flow Chart of the Control Film]

The control film FPR is loaded in the control film preparation space PA2 in step S102. Films other than the film patterned retarder shown in FIG. 5 may be used as the control film FPR.

The loaded control film FPR is transferred in step S104. When the control film FPR is divided in conformity with the size of the display panel PNL, the process for transferring the control film FPR may be omitted.

The loaded control film FPR is centered in step S106. The process for centering the control film FPR corresponds to an instrumental alignment process and may be omitted.

The centered control film FPR is aligned on the table of the second vacuum adsorption unit ABS2 in step S108.

The control film FPR aligned on the table of the second vacuum adsorption unit ABS2 is again aligned by the second vision unit VN2 in step S110.

The control film FPR aligned by the second vision unit VN2 is transferred to the attachment space PA3 by the movement of the second unit UN2 and is attached to the drum unit DRM in step S112.

The release film of the control film FPR attached to the drum unit DRM is peeled by the peeling unit ED in step S114. When there is no release film of the control film FPR, the peeling process may be omitted.

The control film FPR, from which the release film is removed, is attached to the display surface of the display panel PNL by the rotation of the drum unit DRM in step S116.

In the above-described processes, the alignment tolerance of the display panel PNL aligned on the first vacuum adsorption unit ABS1 and the alignment tolerance of the control film FPR aligned on the second vacuum adsorption unit ABS2 may be reduced by an offset correction performed by the first and second vision units VN1 and VN2. Further, the attachment strength between the display panel PNL and the control film FPR is tested by an alignment test system in a subsequent process. Therefore, the fraction defective of the stereoscopic image display panel may be reduced.

When the display panel PNL and the control film FPR are attached to each other through the above-described processes, the generation of bubbles between the display panel PNL and the control film FPR may be prevented through the high precision alignment and adsorption method. Hence, the glass type stereoscopic image display with the improved reliability and the improved display quality may be manufactured. As a result, a viewer may wears polarization glasses and may view the stereoscopic image through the stereoscopic image display thus manufactured.

As described above, the manufacturing device of the stereoscopic image display panel according to the embodiment of the invention attaches the display panel to the control film through the high precision alignment and adsorption method using the adsorption unit interlocked with the vision system and the drum unit, thereby preventing the generation of bubbles between the display panel and the control film. Furthermore, the manufacturing device of the stereoscopic image display panel according to the embodiment of the invention can align the display panel irrespective of the tolerance of the pattern of the control film.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A manufacturing device of a stereoscopic image display panel, the device comprising:
a first unit configured to transfer a display panel provided in a display panel preparation space to an attachment space;
a second unit configured to transfer a control film provided in a control film preparation space to the attachment space; and
a drum unit positioned in the attachment space, the drum unit being configured to adsorb the control film transferred to the attachment space by the second unit in a non-vacuum manner and rotate so as to attach the control film to a display surface of the display panel.

2. The manufacturing device of the stereoscopic image display panel of claim 1, wherein the drum unit includes a micropad, that is attached to an outer circumference of the drum unit, and adsorbs the control film using the micropad in the non-vacuum manner.

3. The manufacturing device of the stereoscopic image display panel of claim 1, wherein the control film includes a film patterned retarder in which first patterned retarders each having a first directionality and second patterned retarders each having a second directionality are alternately disposed.

4. The manufacturing device of the stereoscopic image display panel of claim 1, wherein the display panel preparation space and the control film preparation space are disposed at different heights,
wherein the drum unit reciprocates up and down in the attachment space and rotates in one direction, so as to attach the control film to the display surface of the display panel.

5. The manufacturing device of the stereoscopic image display panel of claim 1, wherein at least one of the first unit and the second unit adsorbs at least one of the display panel and the control film in a vacuum adsorption manner.

6. The manufacturing device of the stereoscopic image display panel of claim 1, further comprising a peeling unit configured to move to the attachment space and peel a release film attached to the surface of the control film when the drum unit adsorbs the control film.

7. The manufacturing device of the stereoscopic image display panel of claim 3, further comprising:
a first vision unit positioned in the display panel preparation space, the first vision unit including at least one camera for recognizing an alignment mark of the display panel; and
a second vision unit positioned in the control film preparation space, the second vision unit including at least one camera for recognizing boundary lines between the first patterned retarders and the second patterned retarders of the control film,
wherein the display panel and the control film are respectively aligned on the first unit and the second unit by the first vision unit and the second vision unit.

8. The manufacturing device of the stereoscopic image display panel of claim 7, wherein the second vision unit recognizes the boundary lines between the first patterned retarders and the second patterned retarders of the control film using a polarization filter attached to a light receiving unit of the at least one camera of the second vision unit and a polarization film attached to the control film.

9. The manufacturing device of the stereoscopic image display panel of claim 7, wherein the second vision unit includes:
central cameras, which are respectively positioned in outer areas of both sides of a central area of the control film and recognize the boundary lines between the first patterned retarders and the second patterned retarders in the outer areas; and
lower cameras, which are respectively positioned in outer areas of both sides of a lower area of the control film and recognize the boundary lines between the first patterned retarders and the second patterned retarders in the outer areas.

10. The manufacturing device of the stereoscopic image display panel of claim 9, wherein the second vision unit performs a first alignment process of the control film using the central cameras and performs a second alignment process of the control film using the lower cameras.

11. The manufacturing device of the stereoscopic image display panel of claim 2, wherein the micropad is a thin sheet having fine holes.

* * * * *